United States Patent
Fernández Mouree et al.

(10) Patent No.: US 12,213,500 B2
(45) Date of Patent: Feb. 4, 2025

(54) PROCEDURE FOR THE OBTENTION OF FLOUR FROM RED SEAWEED

(71) Applicant: COMPAÑÍA ESPAÑOLA DE ALGAS MARINAS S.A., Porriño (ES)

(72) Inventors: Cristina Fernández Mouree, Porriño (ES); Sandra Agulla Molares, Porriño (ES); Laura Lorenzo Leiro, Porriño (ES); Claudia Manjón Curbera, Porriño (ES)

(73) Assignee: COMPAÑIA ESPAÑOLA DE ALGAS MARINAS S.A., Porriño (ES)

( * ) Notice: Subject to any disclaimer, the term of this patent is extended or adjusted under 35 U.S.C. 154(b) by 0 days.

(21) Appl. No.: 18/572,055

(22) PCT Filed: Jun. 22, 2022

(86) PCT No.: PCT/EP2022/067029
§ 371 (c)(1),
(2) Date: Dec. 19, 2023

(87) PCT Pub. No.: WO2022/268886
PCT Pub. Date: Dec. 29, 2022

(65) Prior Publication Data
US 2024/0260624 A1    Aug. 8, 2024

(30) Foreign Application Priority Data
Jun. 23, 2021 (EP) .................................... 21382555

(51) Int. Cl.
A23L 17/60 (2016.01)
A23L 17/00 (2016.01)
A23L 33/105 (2016.01)

(52) U.S. Cl.
CPC ............... *A23L 17/60* (2016.08); *A23L 17/70* (2016.08); *A23L 33/105* (2016.08)

(58) Field of Classification Search
None
See application file for complete search history.

(56) References Cited

U.S. PATENT DOCUMENTS

2005/0048080 A1   3/2005   Katzen
2008/0317683 A1   12/2008  Trudso

FOREIGN PATENT DOCUMENTS

| WO | WO-2007146004 A1 * | 12/2007 | ............. A23L 27/72 |
| WO | 2019183377 A1 | 9/2019 | |
| WO | 2020076698 A1 | 4/2020 | |

OTHER PUBLICATIONS

PCT, International Search Report and Written Opinion, issued for the corresponding International patent application No. PCT/EP2022/067029, mailed Aug. 4, 2022, 12 pages.

* cited by examiner

*Primary Examiner* — Jyoti Chawla
(74) *Attorney, Agent, or Firm* — LUCAS & MERCANTI, LLP

(57) ABSTRACT

A novel procedure for the obtention of seaweed flour from red algae following the steps of (a) selection of a red seaweed of interest; (b) cold wash; (c) treatment in brine; (d) hot wash; (e) cold wash; (f) alcoholic wash; (g) wet grinding; (h) pre-dry; (i) dry; and j) dry grinding and sieving. The seaweed flour obtained from this process is an ingredient to food, especially milk-based aliments such as desserts, yogurts, ice cream or whipping cream, although it also may be useful as texturizing and emulsifier in meat or vegan analogues preparations.

21 Claims, 4 Drawing Sheets

PROCEDURE FOR THE OBTENTION OF FLOUR FROM RED SEAWEED

CROSS-REFERENCE TO RELATED APPLICATIONS

This application is a 371 of PCT/EP2022/067029, filed Jun. 22, 2022, which claims the benefit of European Patent Application No. 21382555.7, filed Jun. 23, 2021, each of which are incorporated herein by reference.

TECHNICAL FIELD

The present invention relates to the provision of a novel procedure for the obtention of flour from a red seaweed. This flour is directed to be used as food ingredient. The invention belongs therefore to the field of food industry.

BACKGROUND ART

Red algae are a large group of multicellular algae, including many seaweeds located in colder waters within the Northern Hemisphere. Red algae include a number of edible seaweeds.

Red algae have a long history of use as a source of nutritional, functional food ingredients and pharmaceutical substances. They are a source of antioxidants including polyphenols, and phycobiliproteins and contain proteins, minerals, trace elements, vitamins and essential fatty acids. Traditionally red algae are eaten raw, in salads, soups, meal and condiments.

*Chondrus crispus* (*C. crispus*), commonly called Irish moss or carrageen moss is a small purplish-red seaweed (up to 22 cm long) found on rocky shores and in pools. The fronds grow dichotomously from a narrow, unbranched stipe and are flat and wide with rounded tips. The principal constituent is a mucilaginous body, made of the polysaccharide carrageenan, which constitutes 55% of its dry weight. The organism also consists of nearly 10% dry weight protein and about 15% dry weight mineral matter and is rich in iodine and sulfur.

*C. crispus* is an industrial source of carrageenan (a sulphated polysaccharide) commonly used as a thickener and stabilizer in milk products, such as ice cream and processed foods.

The carrageenan is obtained by chemical extraction.

Document WO2013033598 A1 describes a process for purifying a cellulose from seaweed after the carrageenan has been extracted. The process comprises extracting >50% of all carrageenan from the seaweed material and purifying the cellulose by at least one of hydrolysis or bleaching. The purpose of the process is the removal of the carrageenan present in the material in order to purify the cellulose.

Document Rupiérez and Toledano 2003 (J Sci and Agriculture 83(12); 1267-72) discloses the amount of soluble and insoluble fractions of non-digestible components of marine seaweeds. The authors do not obtain the seaweed flour after the treatment.

Document Ruipérez and Saura-Calixto 2001 (Eur Food Res Technol 212; 349-54) characterizes the dietary fiber and physicochemical properties of seaweed. The soluble and fibers were analyzed by an enzymatic method.

Document WO2019183377A1 discloses seaweed flour from *C. crispus*. The process described in this document includes a hot cooking (70-90° C.) with high concentration of KCl for several hours. Using this high temperature range the native carrageenan present in the algae is dissolved in water (carrageenan dissolves from 60° C.). These conditions have the disadvantages of (1) risk of partial solubilization of carrageenan and (2) the high percentage of salts affects the cost of the process, nutritional profile of the flour and product taste.

Methods for extraction of carrageenan as described above produce a molecular modification of the alga. FIG. 1 shows the native carrageenan present in the seaweed and the modified carrageenan after extraction. This difference affects the texture of the products on which the carrageenan is added. In addition, most of the carrageenan extraction processes described up to date results in an ingredient which less protein and mineral content than the original seaweed. Using native carrageenan would avoid the use of a chemical process for the obtention of a functional product, allowing the exploitation of the native carrageenan naturally present in seaweed.

There is a need to develop a procedure for obtaining a seaweed flour with comprising native carrageenan and a fiber content similar to the original alga, with a useful life of 24 months at 10-40° C. Since the flour will be used in food industry, the flour should not have color or flavor and have neutral organoleptic properties. The process must avoid the use of chemical ingredients and the product should maintain a nutritional profile similar to the natural seaweed.

Neutral organoleptic property is defined as an ingredient which do not affect to the product matrix in which is added. This means that the ingredient itself does not affect, for example, the flavor of the food.

Consumers are demanding ingredients with natural origin, a recognizable sources and process (transparency), sustainable sources and process with high fibre content. These products are considered "clean labelled". At the same time, consumers demand products with similar quality than traditional market references and without a major price impact.

DESCRIPTION OF THE INVENTION

Summary of Invention

The technical problem to be solved is to provide a new process for obtaining a seaweed flour from a red seaweed. This process avoids the use of chemical agents and the product obtained comprises native carrageenan, a neutral organoleptic profile, a fiber content similar to the fresh seaweed and a useful life of at least 24 months at 10-40° C.

The solution to the technical problem is solved by the compound defined in the claims.

In a first aspect, the invention provides a process for the obtention of seaweed flour comprising the steps of:
 a) selection of a red seaweed of interest;
 b) cold wash;
 c) treatment in brine;
 d) hot wash;
 e) cold wash;
 f) alcoholic wash;
 g) wet grinding;
 h) pre-dry;
 i) dry; and
 j) dry grinding and sieving.

In a second aspect, the invention provides a seaweed flour obtained by the first aspect of the invention, comprising humidity of at most 11% v/w, total fiber above 50% w/w and soluble fiber above 40% w/w.

In a third aspect, the invention provides the use of the seaweed flour obtained by the process as a food ingredient.

In a fourth aspect, the invention provides a food comprising the seaweed flour obtained by the process, in a percentage of 0.01-2% of the final food.

DETAILED DESCRIPTION OF THE INVENTION

In a first aspect, the present invention provides a process for the obtention of seaweed flour comprising the steps of:
a) selection of a red seaweed of interest;
b) cold wash;
c) treatment in brine;
d) hot wash;
e) cold wash;
f) alcoholic wash;
g) wet grinding;
h) pre-dry;
i) dry; and
j) dry grinding and sieving.

The algae are in first place harvested from the sea. The fresh specimens are subjected to a whitening process directly under the sun.

Figure 1:
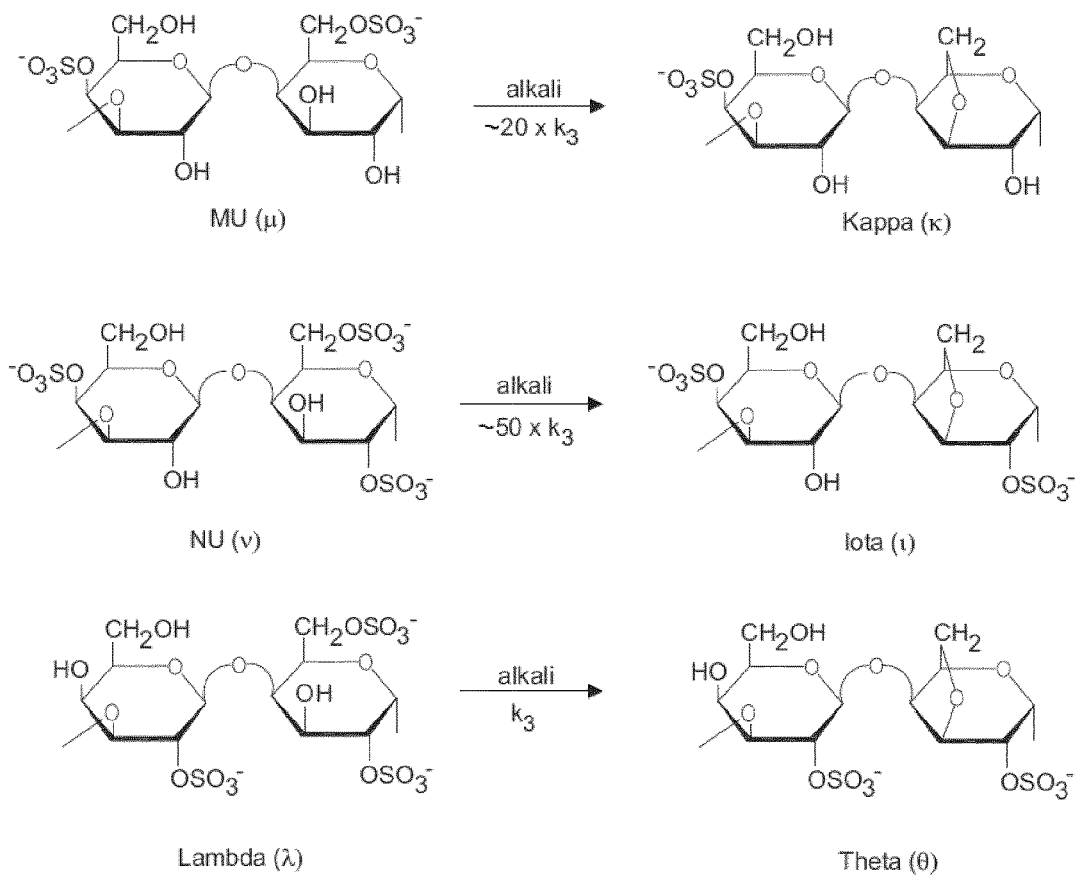
FIG. 1. Formula of native and modified carrageenan.
Figure 2:
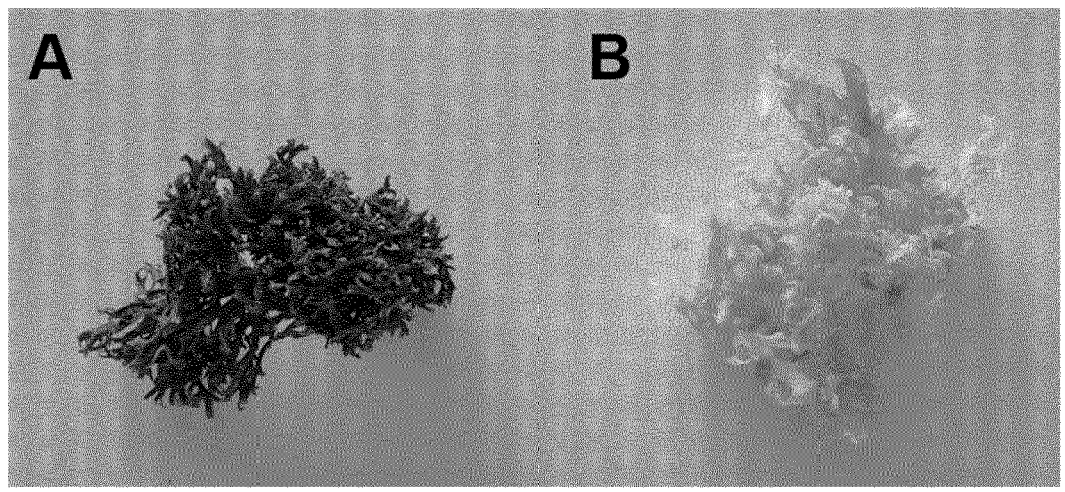
FIG. 2. Fresh (A) and dried (B) *C. crispus* algae.

This whitening process may be performed with fresh or semidried algae (humidity of approximately 50-60%) or with previously dried specimens. In this case, the algae must be wet in sweet or slightly salted water (3-5% w/v NaCl) and then exposed to the sun. During the whitening the specimens must be wet in order the whitening step is fully efficient. The algae are turned around every 24 hours in order to allow a uniform whitening. Exposure under the sun with recirculating air is essential in order to avoid the seaweed to be cooked. Whitening fresh or semidried algae is preferred since the seaweed structure is more open, which allow a better sun exposure in the complete specimen. FIG. 2 shows a sample of *C. crispus* before and after the sun dried. This pre-treatment of the algae produces a white product, which is important in order the color of the final flour does not affect the color of the food. The sun whitening reduces the impurities in the alga due to the wet application during this step.

Figure 3:
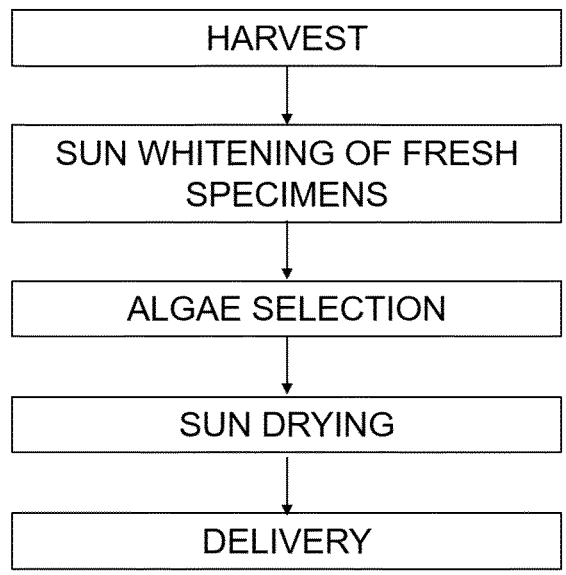
FIG. 3. Flowchart of the harvest of the seaweed.

Once the seaweed has been whitened, or during this process, the different seaweed species are separated. The species of interest are dried completely under the sun. The dried seaweed of interest is packaged and sent to the plant. FIG. 3 shows the flowchart of this process. In a preferred embodiment, step a) comprises sun whitening of fresh, semidried or dried seaweed by wetting the specimens and expose them under the sun with recirculating air, selection of the species of interest and complete drying under the sun.

The selected algae are red, preferably from Rhodophyceae class. More preferably, the red seaweed is selected from the group comprising the genus *Porphyra, Palmaria, Gracilaria, Laurencia, Gelidium, Euchema, Acanthophora, Gigartina* and *Chondrus*. In a more preferred embodiment, the seaweed is selected from the species *Gigartina skottsbergii, Gigartina sandpaper, Gigartina chamissoi, Euchema cottonii, Euchema spinosum* and *Chondrus crispus*. In an even more preferred embodiment, the red alga is *C. crispus*.

Figure 4:
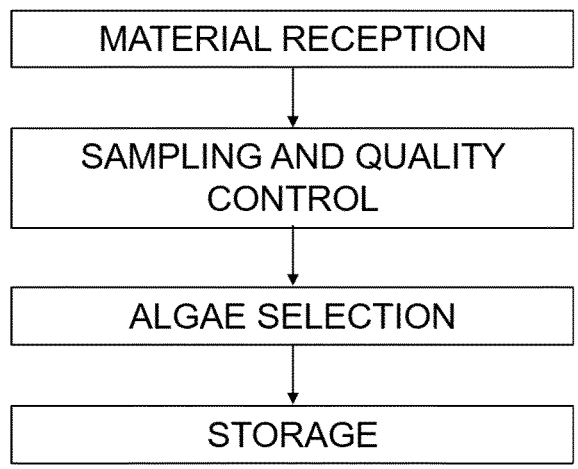
FIG. 4. Flowchart of the algae reception after harvest.
Figure 5:
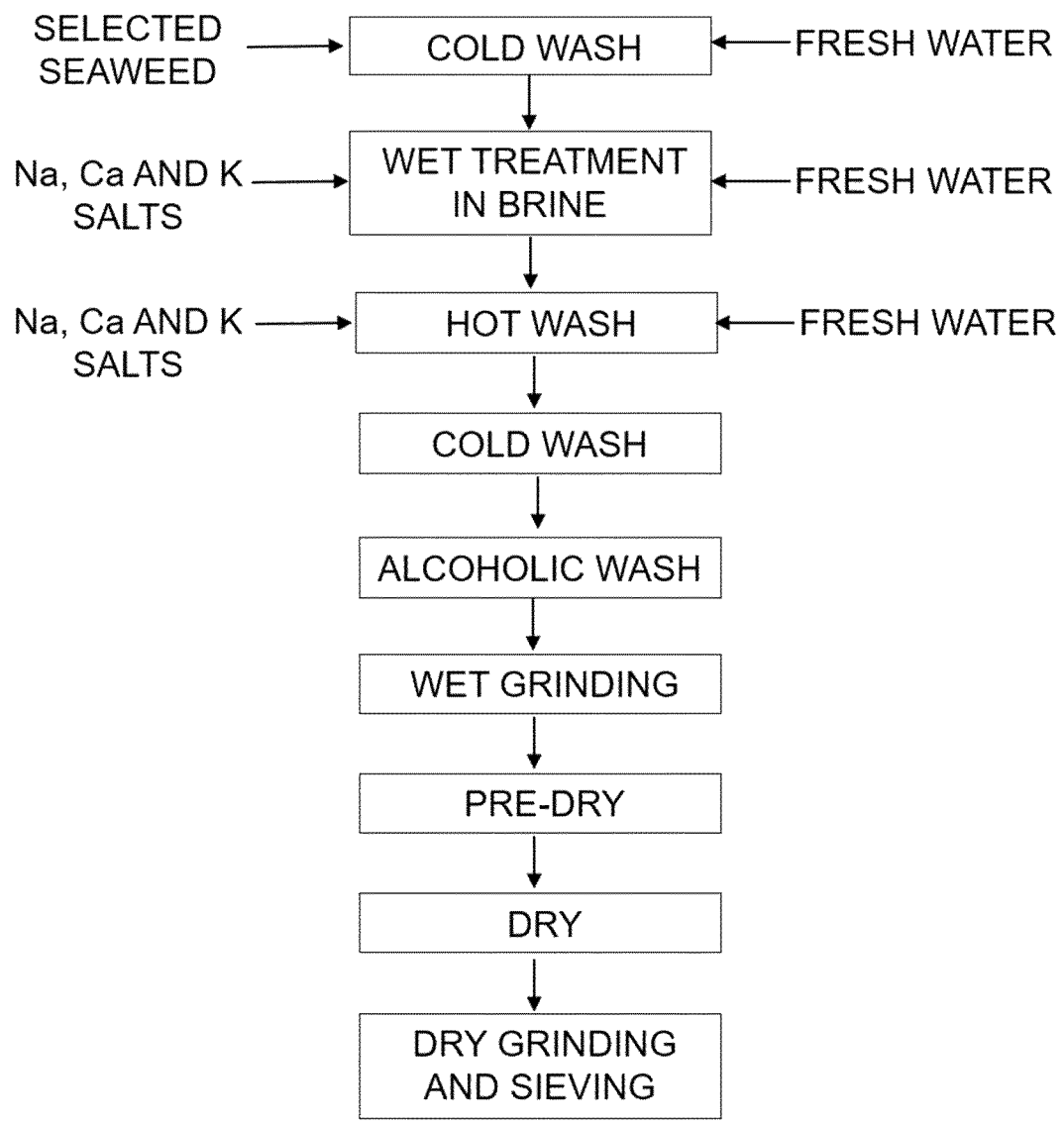
FIG. 5. Flowchart of the process of the invention.

Once the material is received, it is sampled and analyzed for purposes of quality control and the algae complying with the quality standards. Color, impurities presence, mineral analysis and trace elements are analyzed in order to select the best specimens. The selected seaweed is stored until the process for obtaining its flour begins. FIG. 4 shows the flowchart of this process.

The process for the obtention of a seaweed flour starts with a cold wash (b). Preferably, the temperature of the water is between 15 and 25° C. The purpose of this step is the removal of sand and impurities from the sea, which may be attached to the seaweed.

The washed seaweed is introduced in a tank with a solution of water with 10-20% w/v of salt at 15-25° C. for 3-5 days. Preferably, the salt is a mixture of NaCl and KCl. More preferably, the salts are in a concentration of 8-12% w/v NaCl and 3-5% w/v KCl. The solution is changed on day 2, and after two days afterwards. This treatment is performed in presence of air, which allows the homogeneous penetration of the salt in the seaweed and the cleaning the organic material of the specimens. This step improves the organoleptic profile of the final product. Moreover, the brine treatment increases the availability of the seaweed's native carrageenan, which is important for the subsequent steps of the process. The amount of seaweed in the tank in respect of the total salt solution is 0.07-0.125 Kg/L in order the salt may enter into the algae tissues, and the specimen acquires functionality. Increasing the amount of NaCl over KCl in this step favors the swelling of the seaweed, which is preferably in the process, and it is also cheaper than KCl. Functionality is referred to the ability of the seaweed flour to have the desired properties (gelling and an adequate viscosity at low or high temperature) to be used in food industry.

The material obtained in step c) is under a hot wash instep d). The salt concentration during this step is 8-12% w/v KCl and 3-5% w/v NaCl and temperature is between 35 and 45° C. for 2-4 hours. During this step air flows as in step c), which allow homogeneous penetration of the salt in the seaweed tissues. The increased concentration of KCl in this step is necessary to avoid the seaweed's soluble fibers solubilize in the brine due to the increased temperature. It has been proved that the native carrageenan fibers solubilize as temperature increases. The pH of the solution in this step is 9-11. With this step, the availability of the native carrageenan present in the seaweed increases.

After the hot wash, the algae are washed in step e) in order to remove the excess of salt and reduce the % of chlorine in the final product. The presence of chlorine may affect the functionality of the material for edible applications and also the solubility of the flour in water. This would increase syneresis in the gelling process. Therefore, its removal is also required to maintain the organoleptic profile of the final product. The material is washed from 2 to 4 times with fresh water in aeration at 10-15° C., doubling the amount of water respecting the amount of seaweed. The amount of KCl is reduced during step e) in the first wash to 3-4%, and the last wash only is fresh water.

The next step f) is a wash in a water solution comprising 50-60% v/v of alcohol. Preferably, the alcohol is selected from isopropanol and/or food-grade alcohol. This step improves the color removal of the algae, which is important since the final product will be a food ingredient. It is preferably that this ingredient is colorless, in order not to affect the final food/drink. In addition, the alcoholic wash to toughen the seaweed, which is important since subsequent steps will not affect the algae structure. Moreover, in this step part of the seaweed's compounds responsible for its flavor are solubilized, therefore the final ingredient of the process is tasteless.

Step g) is a wet grinding. Any refrigerated device which can reduce the seaweed size to 3-5 cm fibers a may be used, such as blade grinder. This step is important since the next steps would depend on an adequate size of the material. It is necessary the device is refrigerated in order to avoid heating the product, which would dissolve the soluble fibers present therein.

The pre-dry of the grinded seaweed is preferably made in a vacuum system with steam injection. The steam stream is at 70-90° C. until alcohol of step g) completely evaporated. This step h) is important since volatile compounds responsible of bad taste would be eliminated. Preferably the steam flow is 0.3-0.6 Kg steam per minute. More preferably, the steam Flow is applied between 30 minutes and 2 hours. In this step, the organoleptic profile of the product improves. In addition, the combination of steps g) and h) allow sterilization of the product, avoiding microbiological contamination. The features of step g) are also important during step h) since the smaller and homogeneous is the seaweed size, the better would be the steam penetration in its structure and also better the volatile compounds responsible of bad taste will be removed.

In step i) the material is dried. Preferably, this step is performed in fluid bed drying. It is possible also to dry the material in vacuum, decreasing the temperature, however the fluid bed drying is more efficient. The seaweed is dried until humidity is 10% or below. The process is continuous, and the temperature cannot rise above 45-55° C. The adequate size of the seaweed in step g) is also important during the drying, since algae size between 3-5 cm would also result in a better fluidification and dry of the product.

The dried product is then dry grinding in step j). Any grinding device may be used, such as hammer grinder. The grinded material is then sieved in order to select particles on or below 75 μm. The size is key in order to avoid the insoluble fraction of the seaweed affects the texture of the product in the food/drinks to be included. This insoluble fraction is responsible of the sand-like texture. The drying and grinding steps i) and j) respectively eliminate the water content, also limiting the presence of, which contributes to a longer useful life of the final product (up to 24 months).

The product of step j) is the seaweed flour.

In a preferred embodiment, after step j) the seaweed flour is blended with seaweed flours of other batches of the same species in order to ensure a homogeneous product. In another preferred embodiment, the seaweed flour is blended with a seaweed flour from a different seaweed species. This is especially useful, since the combination of flours of different origin or fibers has resulted in synergic effects which may be interesting in nutrition. In a more preferred embodiment, the seaweed flour of step j) is mixed with a fiber of citrus origin. The fiber of citrus origin has at least 80% of insoluble fiber, more preferably at least 90% of insoluble fiber. In a preferred embodiment, the citrus fiber is obtained from lemon and/or lime.

This procedure allows the obtention of a product with a better organoleptic profile. In addition, it is possible to increase the endogenous fiber content of the seaweed, also preserving its nutritional properties. The combination of soluble and insoluble fibers has also nutritional benefits.

In a preferred embodiment, the invention is directed to a process for the obtention of seaweed flour comprising the steps of:
a) selection of a red seaweed of interest selected from the group consisting of *Gigartina skottsbergii, Gigartina sandpaper, Gigartina chamissoi, Euchema cottonii, Euchema spinosum* and *Chondrus crispus*;
b) cold wash between 15 and 25° C.;
c) treatment in brine with 10-20% w/v of salt at 15-25° C. for 3-5 days;
d) hot wash with 8-12% w/v KCl and 3-5% w/v NaCl at 35-45° C.;
e) cold wash at 10-15° C.;
f) wash in a solution with 50-60 v/v alcohol;
g) wet grinding obtaining a size of 3-5 cm;
h) pre-dry in a vacuum system with steam injection with steam stream is at 70-90° C.;
i) dry in fluid bed drying until humidity is 10% or below at a temperature below 55° C.; and
j) dry grinding and sieving for obtention of particles on or below 75 μm.

In a more preferred embodiment, the invention is directed to a process for the obtention of seaweed flour comprising the steps of:
a) selection of the seaweed *C. crispus*;
b) cold wash between 15 and 25° C.;
c) treatment in brine with 8-12% w/v NaCl and 3-5% w/v KCl at 15-25° C. for 3-5 days;
d) hot wash with 8-12% w/v KCl and 3-5% w/v NaCl at 35-45° C.;
e) cold wash at 10-15° C. 2-4 times;
f) wash with a solution of 50-60% v/v of isopropanol and/or food-grade alcohol;
g) grinding obtaining a size of 3-5 cm;
h) pre-dry in a vacuum system with steam injection with steam stream is at 70-90° ° C. and 0.3-0.6 Kg steam per minute;
i) dry in fluid bed drying until humidity is 10% or below at a temperature below 55° C.; and
j) dry grinding and sieving for obtention of particles on or below 75 μm.

The flour obtained by this process is stable and useful at least 24 months at 10-40° C.

In a second aspect, the present invention provides a seaweed flour obtained by any embodiment of the process disclosed above. In a preferred embodiment, the flour comprising humidity of at most 10% v/w, total fiber above 50% w/w and soluble fiber above 40% w/w (70-80% w/w of soluble fiber from the total fiber of the flour). In a more preferred embodiment, the total fiber content in the seaweed flour is 55-70% w/w. Soluble fiber is important since it is water soluble and add viscosity and gelling capacity to the final food. Insoluble part retains water by capillarity, since it is not water soluble.

The flour has the following properties:
Gelling, thickening and particle suspension
Water binding capacity
Emulsifying
Synergy with calcium and potassium ions
Interaction with milk proteins
Soluble over 70° C.
Stable at neutral pH
Thermo-reversible In a preferred embodiment, the red seaweed is preferably from Rhodophyceae class. More preferably, the red seaweed is selected from the group comprising the genus *Porphyra, Palmaria, Gracilaria, Laurencia, Gelidium, Euchema,*

*Acanthophora, Gigartina* and *Chondrus*. In a more preferred embodiment, the seaweed is selected from the species *Gigartina skottsbergii, Gigartina sandpaper, Gigartina chamissoi, Euchema cottonii, Euchema spinosum* and *Chondrus crispus*. In an even more preferred embodiment, the red seaweed is *C. crispus*.

Red algae usually contain 20% humidity after sun drying and approximately 10-15% w/w of impurities. The final amount of fiber in the algae is the result of the washes and dehydration steps, which remove impurities and eliminate moisture up to 10%. Humidity of at most 11% is considered a safe limit to avoid microbial proliferation.

In a third aspect, the present invention refers to the use of the seaweed flour obtained by the process previously described or the seaweed as defined above in food industry. In a preferred embodiment, the seaweed flour is used as food ingredient. In a more preferred embodiment, the seaweed flour is an ingredient to increase the fiber content in a food, emulsifier or thickener. In an even more preferred embodiment, the seaweed flour is as ingredient in milk-derived food (lacteous desserts or lacteous drinks), meat or vegan analogues (meat and lacteous products).

The fiber provides viscosity and stability to the milk during pasteurization or UTH treatments. In addition, this ingredient provides an extra contribution to the amount of fiber in the final product, with the benefits fiber products have in health. The seaweed soluble fiber and the milk protein have a synergy, increasing stability.

The seaweed flour of the invention is present in a percentage of 0.01-2% in the final food. The content in lacteous beverages is preferably 0.05-0.5% w/v of the ingredient and in lacteous deserts is preferably 0.5-1.5% w/w of the ingredient. A lacteous or milk beverage or desert is any food comprising milk as ingredient. Lacteous or milk desserts are, for example, pudding, cake, milkshake, cream, whipping cream or ice cream.

In a preferred embodiment, the red seaweed is preferably from Rhodophyceae class. More preferably, the red seaweed is selected from the group comprising the genus *Porphyra, Palmaria, Gracilaria, Laurencia, Gelidium, Euchema, Acanthophora, Gigartina* and *Chondrus*. In a more preferred embodiment, the seaweed is selected from the species *Gigartina skottsbergii, Gigartina sandpaper, Gigartina chamissoi, Euchema cottonii, Euchema spinosum* and *Chondrus crispus*. In an even more preferred embodiment, the red seaweed is *C. crispus*.

In a fourth aspect, the present disclosure refers to an edible product comprising the seaweed flour described previously.

In a preferred embodiment, the edible product is a milk-derived food (lacteous desserts or lacteous drinks). A lacteous or milk beverage or desert is any food comprising milk as ingredient. Lacteous or milk desserts are, for example, pudding, cake, milkshake, cream, whipping cream or ice cream. The seaweed flour of the invention is present these products in a percentage of 0.01-2% in the final food. The content in lacteous beverages is preferably 0.05-0.5% w/v of the ingredient and in lacteous deserts is preferably 0.5-1.5% w/w of the ingredient. More preferably, in a chocolate milk, the amount of seaweed flour is 0.02-0.04% w/v, in UTH cream the amount of seaweed flour is 0.03-0.05% w/w, in a crème dessert the amount of seaweed flour is 0.10-0.20% w/w, in an ice cream, the amount of seaweed flour is 0.02-0.03% w/w.

In another preferred embodiment, the edible product is meat or a meat analogue (vegan meat).

The advantages of the process described herein over other seaweed flour extraction methods are the following:

The procedure uses directly the seaweed and not a sub-product previously obtained by another process, which would introduce modifications in the raw material. The product obtained by the present process, is therefore considered more natural.

Any chemical process or product in used in the method of the invention.

The final content of the flour resembles to the protean and mineral content of the original product, besides the fiber content.

By applying the process described above, the organoleptic profile of the seaweed is improved, as well as the presentation of the product and its useful life. The final product is in powder form, instead chips or granules as other similar products, which make the ingredient of the invention to be mixed better with other ingredients. In addition, the steps of the procedure remove undesirable volatile components naturally present in the seaweed. In addition, the flour has a color and a size particle which does not affect the food applications, which is important in this industry, also avoiding the effect of insoluble fiber naturally present in the seaweed. Moreover, the seaweed flour obtained by the process has gelling and thickener properties due to the process.

The advantages of this ingredient compared to other gelling/thickener existing solutions on the market lie in its contribution of fiber (55-70% w/w fiber in respect of the total weight of the flour), the nutritional properties of this macro algae (since seaweeds are rich in fiber, proteins and minerals), but also a technological function that helps to improve the performance of production processes due to its particle size, useful life or low humidity, which make this ingredient easy to incorporate in food preparation.

The ingredient is obtained from a recognizable raw material with positive nutritional properties, from a sustainable source. It constitutes a natural and traditional ingredient plant based. This ingredient is also allergen free and contributes to fiber content. Moreover, it has been proved its functional properties contributing to the final product, maintaining product quality The seaweed flour is a source of fiber which, added to food/drinks will benefit the nutritional value of the product. Ultimately, the invention lies in adapting a traditional use of a food to the modern needs of the mass production industry and the consumption habits and quality requirements of today's society.

EXAMPLES

Example 1: Selection of the Seaweed

The algae were obtained from the sea, generally by diving. The specimens were extended and put under the sun until their color is white. During this step, the different species were identified and selected. The selected algae were maintained until they were completely dried. Red seaweed usually contains 20% humidity, and 10-15% impurities after the drying process. Impurities are salts from the sea and sand the algae may carry. FIG. 2 shows a wet specimen (A) and a sun-dried alga (B) of *C. crispus*.

Example 2: Obtention of Seaweed Flour

The first step was the selected algae washing with fresh water (temperature between 15-25° C.). The algae are treated in a centrifugal system with injection of fresh water. Next, the washed algae are introduced into treatment pools.

The pre-treatment brine has a salt concentration: 8-12% NaCl and 3-5% KCl and a temperature of 15-25° C. The algae were treated with aeration to allow the brine to penetrate evenly into the specimen and it lasted 3-5 days. The brine is changed and regenerated on day 1 and every 2 days to allow organic matter to be carried off from the algae, acting as a cleaning agent. This treatment improves the organoleptic profile of the product. This treatment functionalizes the native carrageenan present in the alga, making it more available for the later stages. The proportion of algae with respect to the brine water must be controlled to allow adequate penetration of the brine into the algae and for these to acquire the desired functionality. The proportion used in the process was around 700-1000 kg of algae in 8000-10000 L of brine.

Then, the salt concentration of the brine was amended to 8-12% KCl and 3-5% NaCl and the temperature raised up to 35-45° C. The algae were treated for 2-4 hours with aeration to allow the brine again to penetrate evenly into the algae. The pH of the brine was between 9-11, which is essential in this step. The main objective of this brine is to functionalize the native carrageenan present in the algae that has become more available in the previous stage of treatment.

After the brine treatments, the algae were washed with fresh water to remove excess salts and reduce the % of chlorides in the final product which may affect functionality in food applications and also to improve the organoleptic profile of the final product. The washes were performed in pools with aeration, reducing the algae-water ratio by approximately half compared to the previous stages. The washes were carried out in such a way that the % of KCl present in the wash water is reduced: from 3-4% in the first wash to a last wash only with fresh water. They were carried out between 2-4 washes that were used in countercurrent between different production batches. The temperature of the washes was between 10 and 15° C.

In a subsequent step, a washing process with alcohol was carried out by centrifuging the algae and injecting washing alcohol food grade isopropanol or ethanol. The alcohol was diluted in water in a proportion of 50-60% alcohol.

The wet milling process was carried out with a blade mill and the size of the algae (originally branched type) was reduced to 3-5 cm fibers. Wet grinding is important to improve the efficiency of the following processes. The chopping process was performed by cooling the blades to avoid overheating the product, which would result in the dissolution of the soluble fibers.

The pre-drying was carried out in a vacuum dryer and a steam stream of 0.3-0.6 kg steam per minute at 70-90° C. until the alcohol was completely evaporated. The humidity in this step was around 40-50%.

Then, the water was removed from the product is done by fluid bed drying. The maximum final humidity reached by the product was 10%. The fluid bed drying process was continuous and the maximum temperature of the product during the drying should be 45-55° C.

The dried product was grounded with a hammer mill and separated according to a particle size of 75 microns.

Finally, the product was mixed between different batches to ensure a homogeneous quality. It can be also mixed with other fibers in order to see synergies.

Example 3: Characterization of the Seaweed Flour

The seaweed flour obtained in the Example 2 is a light brown powder which may be used to increase fiber content in foods. Moreover, the ingredient texturizes and enhances viscosity of food. The application dosage has been determined in a range of 0.03-3%.

Experimental analysis have demonstrated that the flour is dispersible in cold and totally soluble over 70° C. in water and milk, but insoluble in vegetable oils, minerals and organic solvents.

pH measurement of the product determined a pH at 20° ° C. between 7-10. The 90% of the particles had a size below 125 μm (120 US mesh, DIN 48). Particles of 100 μm are preferred. The ingredient may be stored a minimum of 24 months when stored cool and dry in unopened bags.

Nutritional analysis, mineral content and trace elements of the algae (raw material of the process) and of the flour resulting from the process of improving the raw material were also analyzed. The nutritional composition of fresh *C. crispus* algae could not be accurately quantified in terms of calories, proteins, fats, minerals, vitamins and dietary fiber, since these values are dependent on the algae growth conditions, the time of year when of the harvest and storage conditions. Table 1 describes the standard values considered a benchmark in determining the nutritional content of algae and derived products ("Low, Calorie, High Nutrition Vegetables from the Sea to help you and feel better". Seibin Arasaki and Teruku Arasaki. Published by Japan Pubns (1981) ISBN 10: 087040475X; ISBN 13: 9780870404757).

The nutritional values of the seaweed flour obtained in Example 2 were analyzed. The results are also in Table 1 and the following methods were used to analyze each parameter:

Energy: Calculation
Fat: Acid hydrolysis-Soxhlet
Proteins: Kjeldahl
Carbohydrates: Calculation
Humidity: Gravimetry
Ash: 550° C. calcination
Non-soluble dietetic fiber: enzymatic-gravimetric
Soluble dietetic fiber: calculation
Total dietetic fiber: enzymatic-gravimetric
Sugar: chemical assessment
Ca, Na, K: ICP digestion

TABLE 1

Average nutritional values of *C. crispus*. Comparison between fresh, dried specimens and the seaweed flour from *C. crispus*.

|  | PARAMETER | FRESH ALGAE | DRIED ALGAE | SEAWEED FLOUR |
|---|---|---|---|---|
| NUTRITIONAL VALUES | Energy (/100 g) | 250.79 kcal | 177 kcal | 264 kcal |
|  | Fat | 1-3% | <1.5% | 0.1% |
|  | Proteins | 15% | 13.8% | 11% |
|  | Carbohydrates | 60% | 0.3% | 0.3% |
|  | Total fiber | 6% | 60.4% | 68% |
|  | Soluble fiber | — | 43.8% | 48.7% |
|  | Insoluble fiber | — | 16.6% | 19.3% |
|  | Ash | — | 18.8% | 24.0% |
|  | Humidity | — | 6.6% | 11% |
| MINERALS | I | 0.02-0.03% | 9.35 ppm | 0.33% |
|  | Ca | 0.9% | 0.3% | 0.09% |
|  | Na | 2.2% | 2.6% | .0.16% |
|  | K | 3.4% | <0.01% | 8.3% |
|  | Mg | 0.7% | 0.936% | 0.01% |
|  | P | 0.8% | 0.161% | 0.168% |
|  | Fe | 0.02% | 64.3 ppm | 381 ppm |
|  | Mn | 0.0013% | 4.77 ppm | 21.9 ppm |
|  | Cu | 0.0008% | 2.41 ppm | 5.77 ppm |
|  | Zn | 0.008% | 5.11 ppm | 6.47 ppm |
|  | As | 3 | 6.6 ppm | 2.9 ppm |

TABLE 1-continued

Average nutritional values of *C. crispus*. Comparison between fresh, dried specimens and the seaweed flour from *C. crispus*.

| PARAMETER | FRESH ALGAE | DRIED ALGAE | SEAWEED FLOUR |
|---|---|---|---|
| Cd | 0.5 | 2.59 ppm | 3.17 ppm |
| Hg | 0.1 | <0.003 | <0.003 |
| Pb | 5 | <1 | <1 |
| Sn | 5 | <2 | <2 |

Table 1 shows that the fiber content of the dry algae and seaweed flour compared to the fresh algae. Moreover, it may be concluded that the process described herein does not affect the composition or nutritional values of the dried algae. The importance of soluble fiber lies in the fact that it is functional fiber (native carrageenan) that has the ability to dissolve hot and provide gelling.

The presence of allergens (gluten, crustaceous, seafood) and microbiological contamination was also analyzed, the results are not shown, since all were negative.

Example 4: Combination of Seaweed Flour with Citrus Fiber

Citrus fiber is a fiber source with water and oil retention capacity pH and temperature independent. It has emulsifying properties and it can be used as replacement of egg or fat.

Table 2 shows the nutritional values of the citrus fiber and the seaweed flour:

| Parameter (%) | Citrus fibre (per 100 g) | Seaweed flour (per 100 g) |
|---|---|---|
| Energy | | |
| Total energy (Kj) | 91.88 | 1104.68 |
| Total energy (kcal) | 21.24 | 264 |
| Total fat | 1.00 | 0.10 |
| Total proteins (vegetable) | 1.00 | 11.00 |
| Total available carbohydrates | 1.36 | 0.30 |
| Dietary fiber: | | |
| Total | 91.55 | 68.00 |
| Soluble | 4.47 | 48.70 |
| Insoluble | 87.07 | 19.30 |

Combination of both ingredients in specific applications provide texture and gelling with syneresis control. The addition of citric fiber to the seaweed meal improves the water retention capacity and the structure when hot, conditions where the seaweed meal does not provide gelling. The combination of both ingredients have been tested in meat products and ice cream.

Example 5: Recipes with Seaweed Flour 5.1 UHT Chocolate Milk
Ingredients:
91.1% v/v semi skimmed milk
7.0% w/v sugar
1.8% w/v cocoa powder 10/12
0.034%-0.035 w/v seaweed flour (*C. crispus*)

The seaweed flour was blended with the dry ingredients and the mixture was incorporated to the cold milk using high-speed mixing (Sylverson). The mixture was heated at 75° C. and homogenized at 180 bars in 2 steps. Then, a UHT heat treatment at 140° C. for 4 seconds was applied. The mixture was cooled below 15° C. (preferably at 10° C.) and the recipient was filled aseptically.

The nutritional values of the product are shown below:
Fat: 1.5%
Proteins: 2.8%
Carbohydrates: 11.0%
Total kcal/KJ: 68/287

Viscosity of the final product was analyzed in a Brookfied RV viscometer with ULA needle and a 100 rpm and a rheometer (Amplitude sweep with Parallel plate/SPP 40-Osc-Torque sweep-Yield Stress measurement 10 C; conditioning step at 10° C.; Amplitude sweep at 10° C./0.2 Hz/torque 0.01 to 1000 microNm/20 points per decade), and compared with a commercial benchmark without the ingredient of the invention but comprising food additives. The result of the viscosity of the benchmark was 16 cps, whereas the milk-based product comprising seaweed flour was between 13 and 25 cps, depending its dosage.

Table 3 shows the result of the viscosity assay with seaweed flout at 0.034 and 0.035%

| Product | Viscosity 5 days | Turbiscan stability Index |
|---|---|---|
| Seaweed flour 0.034% | 10.3 cps | 1.5 |
| Seaweed flour 0.035% | 10.5 cps | 1.85 |

The cocoa milkshake allows full cocoa suspension, is stable over the complete product shelf life. Also, the presence of the seaweed flour avoids marbling, phase separation and other chocolate milk defects. Moreover, it has an indulgent mouthfeel and a controlled viscosity of the final product.

Figure 6:
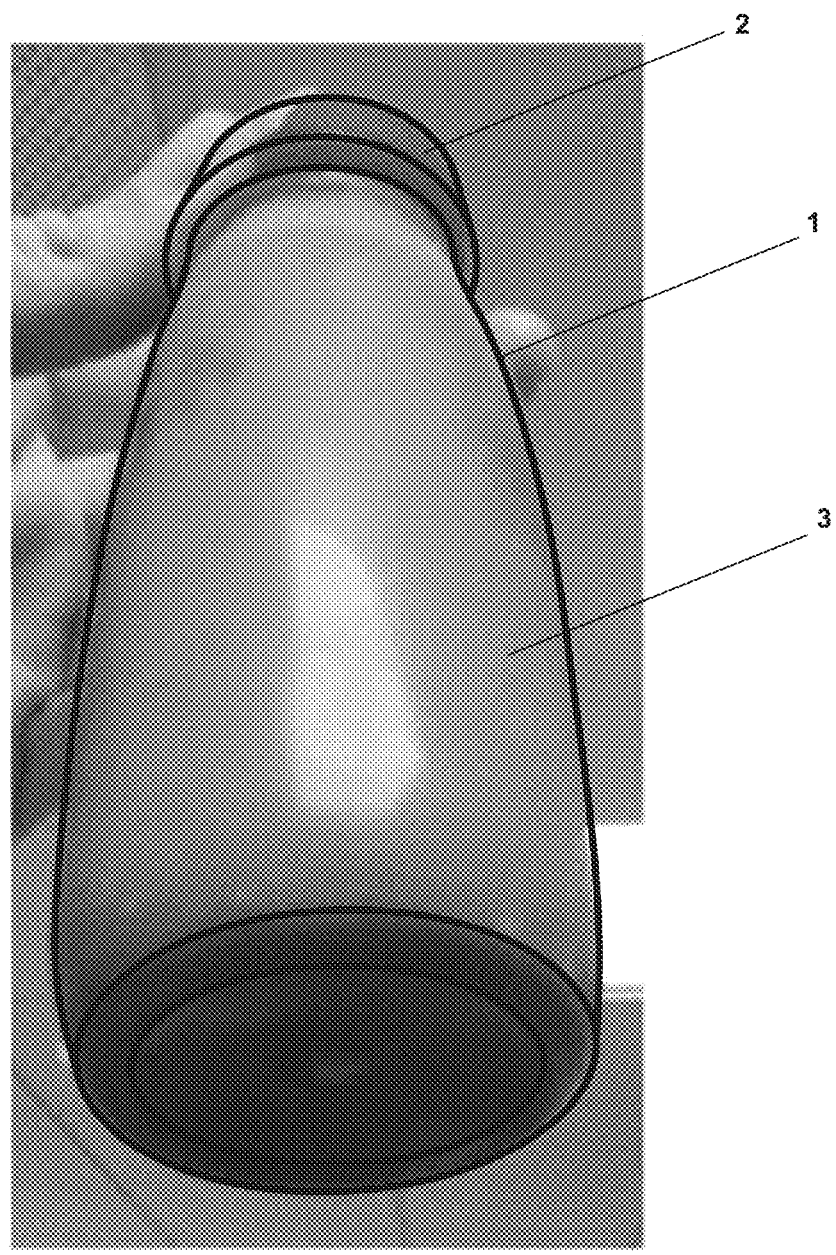
FIG. 6. Milkshake comprising the seaweed flour. (1): bottle; (2): stopper, (3): milkshake.

Thanks to the intrinsic viscosity and milk protein synergy of the seaweed, the seaweed flour is able to suspend cocoa particles and gives mouthfeel to the drink. FIG. 6 shows the cocoa milkshake.

The organoleptic profile of the cocoa milkshake was determined in a food matrix and sensorial analysis in an internal tasting and validation with clients.

5.2 Pasteurized Whipping Cream
Ingredients:
92.04% w/v cream (38% fat)
7.92% w/v skimmed UHT milk
0.035% w/v seaweed flour (*C. crispus*)

The seaweed flour was dispersed into the milk using a high-speed mixing (Silverson). The dispersion was added to the cream in a 2 L glass beaker. The ingredients were mixed with a glass rod and was put in a fridge. The mixture was stirred every 5 minutes in a total of 20 minutes. Then the mixture was heated at 80° C. and homogenized at 15 bars. A UHT heat treatment at 132° C. for 4 seconds was applied. Afterwards, the product was cooled at 10° C. and the recipient was filled aseptically. The whipping cream should be stored for a minimum of 24 hours refrigerated before use.

Table 4 shows the result of the viscosity assay of the cream. The negative control is the same cream without seaweed flour.

| Product | Viscosity before UHT (10° C.) | Viscosity before UHT (10° C.) | Viscosity 24 h 10° C. | Over run | Bloom/ Break | Viscosity 3 d 10° C. | Whey separation 24 h |
|---|---|---|---|---|---|---|---|
| Negative control | 76.3 cps | 62.6 cps | 92.4 cps | 65% | 62/120 | 2240 cps | 38.6% |
| S. flour 0.035% | 110 cps | 444 cps | 852 cps | 63% | 66/118 | 3150 cps | 7.2% |

The cream comprising the seaweed flour has stability over its shelf life, controlled viscosity and avoid undesired gelling, improving the whipping.

The organoleptic profile of the whipping cream was determined in a food matrix and sensorial analysis in an internal tasting and validation with clients.

5.3 Ice Cream

Ingredients:
- 58.6% v/v whole milk (3.6% fat)
- 15.6% w/v cream (38% fat)
- 14.0% w/v crystal sugar
- 7.4% w/v skimmed milk powder
- 4.0% w/v dextrose
- 0.2% w/v emulsifier
- 0.1-0.2% w/v locust bean gum
- 0.02%-0.04 w/v seaweed flour (C. crispus)
- flavor and/or color (optional)

The seaweed flour was blended with the dry ingredients. The liquids were heated at 60° C. and the dry ingredients were dispersed into the liquids. The mixture was heated at 80° C. and homogenized at 180 bars in 2 stages. Then, an UHT heat treatment at 132° C. for 4 seconds was applied and the recipient was filled aseptically at 5° C. The mixture was kept from 4 to 24 hours and next the mixture was whipped with an ice cream machine. The product was stored in the freezer straight after whipping.

The nutritional values of the product are shown below:
- Fat: 8.0%
- Proteins: 4.7%
- Carbohydrates: 26.0%
- Total kcal/KJ: 195/818

The organoleptic profile of the ice cream was determined in a food matrix and sensorial analysis in an internal tasting and validation with clients.

5.4 Vanilla Crème Dessert

Ingredients:
- 81.5% v/v semi skimmed UTH milk
- 10.0% w/v sugar
- 1.02% w/v skimmed milk powder
- 4.83% w/v UHT cream 35% fat
- 2.5% w/v Novation 3300 starch
- 0.15% w/v seaweed flour (C. crispus)
- 0.1% w/v flavor and/or color (optional)

The seaweed flour was blended with the dry ingredients. Any corn modified starch could be used, modifying the recipe accordingly. The dry mix was dispersed and mixed into the milk using a high shear mixer (Sylverson). The pH was measured and adjusted to pH=7.0. Then, the mixture was heated at 60° C. and homogenized at 50 bars in 2 stages. A UHT heat treatment at 140° C. for 4 seconds was applied and the recipient was filled aseptically at 10° C.

The nutritional values of the product are shown below:
- Fat: 3.02%
- Proteins: 2.96%
- Carbohydrates: 16.9%
- Total kcal/KJ: 107/449

The viscosity of the final product was analyzed as mentioned above using 0.15% seaweed flour (15150 cps) and 0.20% seaweed flour (28200 cps). The final product had a creamy texture, stable properties over the complete self-life. Syneresis was avoided and the viscosity was controlled during processing and consumption. Absence of carrageenan increase the syneresis of starch, which is a problem to the product. Addition of seaweed flour provides a clean label solution to this problem. A benchmark of carrageenan was also analyzed. The texture obtained with carrageenan is more variable, since each extract allow a different texture profile, with high variability. However, with the seaweed flour, a creamy, gelled texture was achieved. This effect is due to the presence of native carrageenan in the product. The results with the seaweed flour are homogeneous and reproducible, in line with most of commercial products available.

The organoleptic profile of the dessert was determined in a food matrix and sensorial analysis in an internal tasting and validation with clients. A comparative test with the same product with different ingredients comprising carrageenan was performed. The tasting panel determined that there were not organoleptic differences among the dessert comprising the seaweed flour and other carrageenan sources available in the market. It may be concluded therefore that the organoleptic profile of the flour is neutral, since it does not affect to the feeling the consumer has on the food.

5.5 Meat Emulsion and Meat Injection

Finally, it was analyzed the effect of the seaweed flour obtained in Example 2 in a meat emulsion.

Ingredients:
- 27.0% w/v Lean meat
- 65.3% v/v water
- 2.0% w/v salt
- 2.0% w/v dextrose
- 0.5% w/v STPP
- 0.2% w/v sodium erythorbate
- 2.0% w/v maltodextrin
- 1.0% w/v seaweed flour (C. crispus)

The meat was chopped at 5 mm size and then it was mixed with the water. The rest of powder ingredients were added, and a container was filled with this mass. Vacuum was applied and finally the product was cooked at 80-85° C. until the temperature inside the meat was 74-78° C.

Gel strength and cooking losses were evaluated.

The advantages of using the seaweed flour were a reduction of fresh drip loss, syneresis control, increase of cooking yield, good cohesiveness and sliceability, emulsified meat and a firm and elastic texture of the product.

A meat injection was also made, by mixing 87.49% v/v water, 1.62% w/v STPP, 5.80% w/v salt, 4.09 w/v dextrose and 1.0% w/v of C. crispus flour with a mixer until all the ingredients are fully dispersed. All the ingredients were blended at 4° C. After one step injection into the meat, the product was tumbled by 1 hour and then ageing for 8 hours. Finally, the filled meat was cooked at 78° C. until the temperature inside the meat was 72° C.

Viscosity of the meat with 35.6% of the injection was measured with a value of 45.7 cps.

The invention claimed is:

1. A process for obtaining seaweed flour comprising the steps of:
   a) selecting a red seaweed of interest;
   b) cold washing the selected red seaweed from step a) at 15-25° C.;
   c) treating the washed seaweed from step b) in brine with a solution of water with 10-20% w/v of a mixture of NaCl and KCl at 15-25° C. for 3-5 days;
   d) hot washing the treated seaweed from step c) at 35-45° C. for 2-4 hours;
   e) cold washing the hot washed seaweed from step d) at 10-15° C.;
   f) alcoholic washing the cold washed seaweed from step e);
   g) wet grinding the alcoholic washed seaweed from step f);
   h) pre-drying the grinded seaweed from step g);
   i) drying the pre-dried seaweed from step h); and
   j) dry grinding and sieving the dried seaweed from step i).

2. The process according to claim 1, wherein the red seaweed of interest is selected from the group consisting of the genus *Porphyra, Palmaria, Gracilaria, Laurencia, Gelidium, Euchema, Acanthophora, Gigartina* and *Chondrus*.

3. The process according to claim 2, wherein the red seaweed is *Chondrus crispus*.

4. The process according to claim 1, wherein the salt concentration in step c) is 8-12% w/v KCl and 3-5% w/v NaCl and with a temperature between 35 and 45° C. for 2-4 hours.

5. The process according to claim 1, wherein the washing solution in step f) is a water solution comprising 50-60% v/v of alcohol.

6. The process according to claim 1, wherein the pre-drying of the grinded seaweed in step h) is made in a vacuum system with steam injection.

7. The process according to claim 1, wherein the size of the grinded seaweed after step g) is 3-5 cm.

8. The process according to claim 1, wherein the pre-drying is performed in a vacuum system with steam injection.

9. The process of claim 8, wherein the pre-drying is performed at 70-90° C.

10. The process according to claim 1, wherein the steam flow is 0.3-0.6 kg steam per minute.

11. The process according to claim 1, wherein the drying in step i) is performed by fluid bed drying.

12. The process of claim 11, wherein the temperature is below 55° C.

13. The process according to claim 1, wherein the size of the particles after step j) is 75 μm or less.

14. The process of claim 1, additionally comprising the step of mixing the seaweed flour obtained in step j) with other batches of the same or a different seaweed species.

15. The process for the obtention of seaweed flour comprising the steps of:
   a) selecting a red seaweed of interest selected from the group consisting of *Gigartina skottsbergii, Gigartina sandpaper, Gigartina chamissoi, Euchema cottonii, Euchema spinosum* and *Chondrus crispus*;
   b) cold washing the selected red seaweed from step a) between 15 and 25° C.;
   c) treating the washed seaweed from step b) in brine with 10-20% w/v of the mixture of NaCl and KCl at 15-25° C. for 3-5 days;
   d) hot washing the treated seaweed from step c) with 8-12% w/v KCl and 3-5% w/v NaCl at 35-45° C.;
   e) cold washing the hot washed seaweed from step d) at 10-15° C.;
   f) washing the cold washed seaweed from step e) in a solution with 50-60 v/v alcohol;
   g) grinding the washed seaweed from step f) and obtaining a size of 3-5 cm;
   h) pre-drying the grinded seaweed from step g) in a vacuum system with steam injection with steam stream is at 70-90° C.;
   i) drying the pre-dried seaweed from step h) in fluid bed drying until humidity is 10% or below at a temperature below 55° C.; and
   j) dry grinding and sieving the dried seaweed from step i) for obtention of particles on or below 75 μm.

16. The process for obtaining seaweed flour according to claim 15, comprising the steps of:
   a) selecting the seaweed *C. crispus*;
   b) cold washing the selected seaweed from step a) between 15 and 25° C.;
   c) treating the cold-washed seaweed from step b) in brine with 8-12% w/v NaCl and 3-5% w/v KCl at 15-25° C. for 3-5 days;
   d) hot washing the treated seaweed from step c) with 8-12% w/v KCl and 3-5% w/v NaCl at 35-45° C.;
   e) cold washing the hot washed seaweed from step d) at 10-15° C. 2-4 times;
   f) washing the cold washed seaweed from step e) with a solution of 50-60% v/v of isopropanol and/or food-grade alcohol;
   g) grinding the washed seaweed from step f) and obtaining a size of 3-5 cm;
   h) pre-drying the grinded seaweed from step g) in a vacuum system with steam injection with steam stream is at 70-90° C. and 0.3-0.6 Kg steam per minute;
   i) drying the pre-dried seaweed from step h) in fluid bed drying until humidity is 10% or below at a temperature below 55° C.; and
   j) dry grinding the dried seaweed from step i) and sieving for obtention of particles on or below 75 μm.

17. The seaweed flour obtained by the process of claim 16 comprising humidity of at most 11% v/w, total fiber above 50% w/w and soluble fiber above 40% w/w.

18. Use of the seaweed flour obtained by the process of claim 1 as food ingredient.

19. Food comprising the seaweed flour obtained by the process of claim 1 in a percentage of 0.01-2% of the final food.

20. The food of claim 19, wherein this food is selected from milk-derived food, meat or meat analogue.

21. The food of claim 19, additionally comprising citric fiber.

* * * * *